US010633037B2

(12) United States Patent
Baccouche et al.

(10) Patent No.: US 10,633,037 B2
(45) Date of Patent: Apr. 28, 2020

(54) VEHICLE UNDERBODY ASSEMBLY WITH THERMALLY TREATED REAR RAIL

(71) Applicant: Ford Global Technologies, LLC, Dearborn, MI (US)

(72) Inventors: Mohamed Ridha Baccouche, Ann Arbor, MI (US); Saied Nusier, Canton, MI (US); Raj Sohmshetty, Canton, MI (US); Rohit Telukunta, Madison Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 193 days.

(21) Appl. No.: 15/625,491

(22) Filed: Jun. 16, 2017

(65) Prior Publication Data

US 2018/0362096 A1    Dec. 20, 2018

(51) Int. Cl.
| | | |
|---|---|---|
| *B62D 29/00* | (2006.01) | |
| *C21D 8/02* | (2006.01) | |
| *C21D 1/18* | (2006.01) | |
| *C21D 1/673* | (2006.01) | |
| *B21D 37/16* | (2006.01) | |

(Continued)

(52) U.S. Cl.
CPC ......... *B62D 29/007* (2013.01); *B21D 22/022* (2013.01); *B21D 37/16* (2013.01); *B21D 53/88* (2013.01); *B62D 21/03* (2013.01); *B62D 21/05* (2013.01); *C21D 1/18* (2013.01); *C21D 1/673* (2013.01); *C21D 8/0205* (2013.01);

(Continued)

(58) Field of Classification Search
CPC .... B62D 28/007; B62D 22/022; B62D 37/16; B62D 53/88; B62D 21/03; B62D 21/05

USPC .......................... 296/187.11, 193.08, 203.04
See application file for complete search history.

(56) References Cited

U.S. PATENT DOCUMENTS 6,435,298 B1    8/2002    Mizuno et al.
7,678,208 B2    3/2010    Bodin
(Continued)

FOREIGN PATENT DOCUMENTS

WO    2016046637 A1    3/2016
WO    2016097224 A1    6/2016
WO    2017015280 A1    1/2017

OTHER PUBLICATIONS

R. Kollekc, R. Veit, "Tools and Technologies for Hot Forming with Local Adjustment of Part Properties," Materials Science Forum, vols. 638-642, pp. 3919-3924, 2010.

*Primary Examiner* — Joseph D. Pape
(74) *Attorney, Agent, or Firm* — David Coppiellie; Brooks Kushman P.C.

(57) ABSTRACT

A vehicle underbody assembly including a pair of rockers, a pair of rear rails, a first cross member, and a second cross member is provided. Each of the pair or rear rails extends from one of the rockers and each includes a rear portion, a first mid-portion, a second mid-portion, and a forward portion. Each of the forward portions is secured to one of the rockers at one of a first joint and a second joint. The first cross member extends between the rear rails at a transition region between the second mid-portion and the forward portion. The second cross member extends between the rear rails at locations adjacent the first and second joints. Each of the rear rails is thermally treated so that the second mid-portions form a hard strength zone. The hard strength zone may further be defined as a zone having a fully martensitic microstructure.

17 Claims, 7 Drawing Sheets

(51) Int. Cl.
   *B21D 22/02* (2006.01)
   *B21D 53/88* (2006.01)
   *B62D 21/05* (2006.01)
   *B62D 21/03* (2006.01)

(52) U.S. Cl.
   CPC ...... *C21D 8/0294* (2013.01); *C21D 2211/008* (2013.01); *C21D 2221/01* (2013.01)

(56) References Cited

U.S. PATENT DOCUMENTS

| | | |
   |---|---|---|
   | 8,118,954 B2 | 2/2012 | Beenken et al. |
   | 8,328,272 B2 * | 12/2012 | Fujimura ........... B62D 25/2027 296/187.11 |
   | 8,382,199 B2 | 2/2013 | Bodin |
   | 8,691,032 B2 | 4/2014 | Thomas et al. |
   | 9,039,073 B2 | 5/2015 | Yajima et al. |
   | 9,283,908 B2 | 3/2016 | Blumel et al. |
   | 9,308,564 B2 | 4/2016 | Petocki et al. |
   | 9,359,663 B2 | 6/2016 | Mizuta et al. |
   | 2006/0202519 A1 * | 9/2006 | Latimer, III ........... B62D 25/08 296/203.04 |
   | 2009/0045638 A1 | 2/2009 | Handing et al. |
   | 2012/0304448 A1 | 12/2012 | Hartmann et al. |
   | 2013/0136945 A1 | 5/2013 | Charest et al. |
   | 2016/0362139 A1 * | 12/2016 | Sekiguchi ............ B62D 21/152 |
   | 2017/0051371 A1 | 2/2017 | Chauvin et al. |

* cited by examiner

VEHICLE UNDERBODY ASSEMBLY WITH THERMALLY TREATED REAR RAIL

TECHNICAL FIELD

This disclosure relates to an assembly for a vehicle underbody including a rear rail thermally treated to have varied strength zones.

BACKGROUND

Automotive manufacturers are driven to design light weight vehicles with increased crash performance and reduced fuel consumption. The manufacturers have transitioned from a usage of mild steels for vehicle components to advance high strength steels and ultra-high strength steels along with aluminum. Hot stamping processes for vehicle components allow creation of fully martensitic structures. However, the hot stamping process may create vehicle components with undesirable qualities. For example, vehicle components having uniform microstructures may not have enough strength to sufficiently withstand impact stresses at component geometry transitions without additional reinforcement parts.

This disclosure is directed to solving the above problems and other problems as summarized below.

SUMMARY

A vehicle underbody assembly includes a pair of rockers, a pair of rear rails, a first cross member, and a second cross member. Each of the pair or rear rails extends from one of the rockers and each includes a rear portion, a first mid-portion, a second mid-portion, and a forward portion. Each of the forward portions is secured to one of the rockers at one of a first joint and a second joint. The first cross member extends between the rear rails at a transition region between the second mid-portion and the forward portion. The second cross member extends between the rear rails at locations adjacent the first and second joints. Each of the rear rails is thermally treated so that the second mid-portions form a hard strength zone. The hard strength zone may further be defined as a zone having a fully martensitic microstructure. The hard strength zones at the transition regions may prevent deformation of each of the second mid-portions when subjected to an axial load of between 5000 and 15,000 pounds. The transition region may further be defined as a transition from a first central axis defined by the rear portion to a second central axis defined by a lower portion of the second mid-portion. Each of the rear portions may have a microstructure of ferrite and/or pearlite and each of the first mid-portions may be thermally treated to form a microstructure of one or more of ferrite, pearlite, martensite, and bainite. Each of the second mid-portions may extend outboard at the transition region at an angle between ten and thirty degrees. Each of the first mid-portions may be thermally treated at a temperature between 700 and 900 degrees Celsius to form a medium strength zone and each of the second mid-portions may be thermally treated at a temperature at or above 900 degrees Celsius to form the hard strength zone. Each of the medium strength zones may have a tensile strength between 600 MPa and 1000 MPa and each of the hard strength zones may have a tensile strength between 1000 MPa and 1900 MPa.

A method for creating a vehicle component includes thermally treating a first mid-portion of a blank at a first temperature to form a first strength zone; thermally treating a second mid-portion of the blank at a second temperature to form a second strength zone; and transferring the blank after heating to a die to form a vehicle rear rail. The second strength zone is harder than the first strength zone and spans on either side of a geometric transition region between a first longitudinal axis and a second longitudinal axis. The first temperature may further be defined as a temperature between 700 and 900 degrees Celsius to form a first mid-portion microstructure including one or more of ferrite, pearlite, martensite, and bainite and the second temperature may further be defined as a temperature at or above 900 degrees Celsius to form a fully martensitic microstructure of the second mid-portion. The first temperature may further be defined as a cooling rate at between 10 and 20 degrees Celsius per second to form a first mid-portion microstructure including one or more of ferrite, pearlite, martensite, and bainite and the second temperature may further be defined as a cooling rate at approximately 100 degrees Celsius per second to form a fully martensitic microstructure of the second mid-portion.

A rear rail for a vehicle includes a rear portion, a first mid-portion, and a second mid-portion. The rear portion includes a soft strength zone. The first mid-portion is thermally treated to form a medium strength zone extending from the rear portion. The second mid-portion is thermally treated to form a hard strength zone extending from the first mid-portion, downward, and outboard to a forward portion of the rear rail to structurally reinforce the rear rail at the downward and outboard geometry change. The first mid-portion may be thermally treated at a temperature between 700 and 900 degrees Celsius and the second mid-portion may be thermally treated at a temperature at or above 900 degrees Celsius. The thermal treatment of the first mid-portion may form a microstructure having one or more of ferrite, pearlite, martensite, and bainite. The thermal treatment of the second mid-portion may form a fully martensitic microstructure. The second mid-portion may be thermally treated to form a hard strength zone and may be located adjacent sub-frame assembly joints. The first mid-portion may be thermally treated at a cooling rate between 10 and 20 degrees Celsius per second and the second mid-portion may be thermally treated at a cooling rate of approximately 100 degrees Celsius per second. The thermal treatment may be a cooling process administered within a die having a coolant channel with a first portion and a second portion spaced apart from the second mid-portion a length less than a length between the coolant channel first portion and the first mid-portion. The rear rail may be thermally treated so that the rear portion does not receive heat and retains a microstructure including one or both of ferrite and pearlite. The second mid-portion may extend downward at an angle between ten and thirty degrees and outboard at an angle between ten and thirty degrees. The hard strength zone may have a tensile strength tuned to prevent deformation of the second mid-portion when the rear rail is subjected to an axial load of between 5,000 and 15,000 pounds.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be used in particular applications or implementations.

Figure 1:
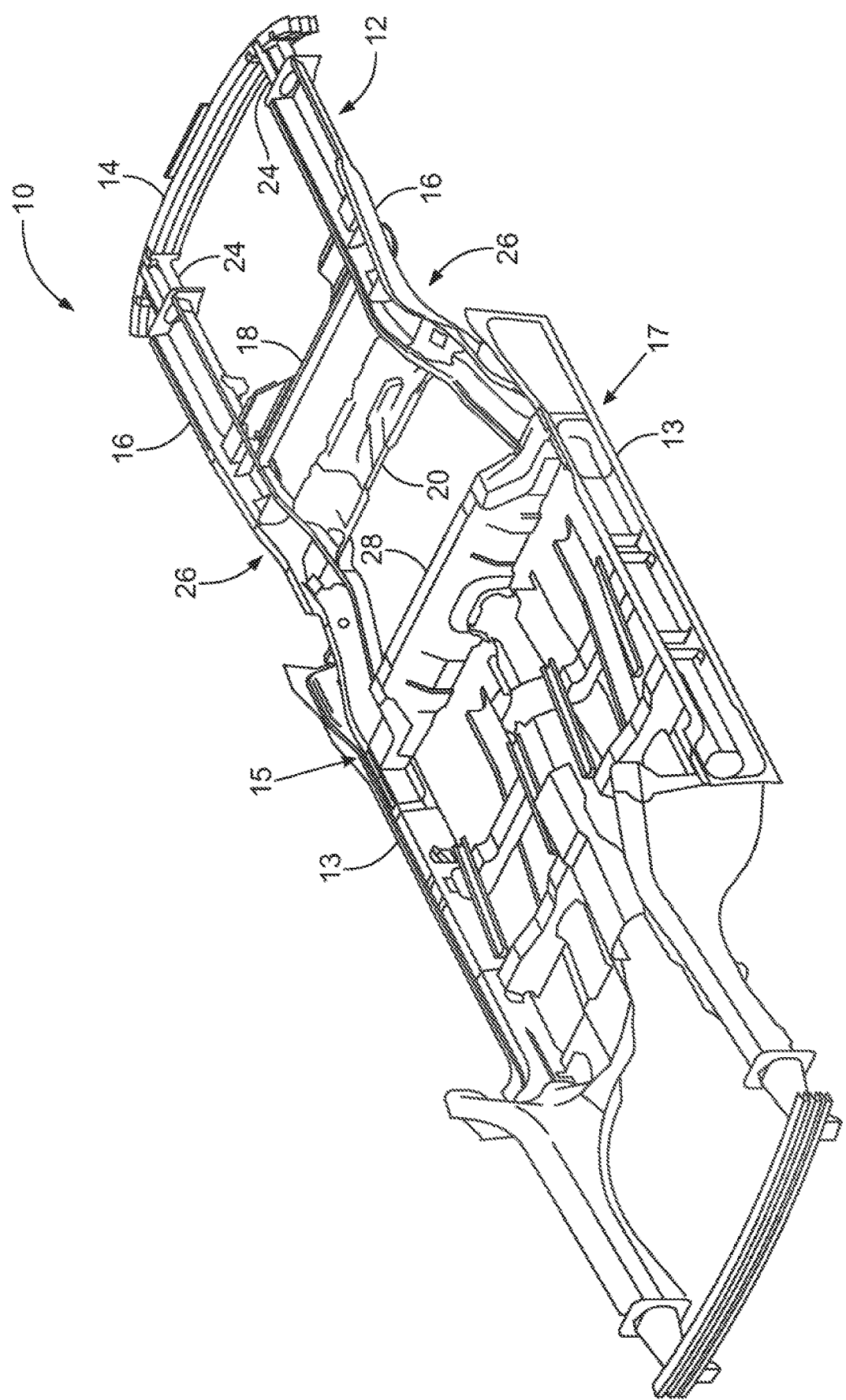
FIG. 1 is a front perspective view of an example of a portion of a vehicle body.
Figure 2:
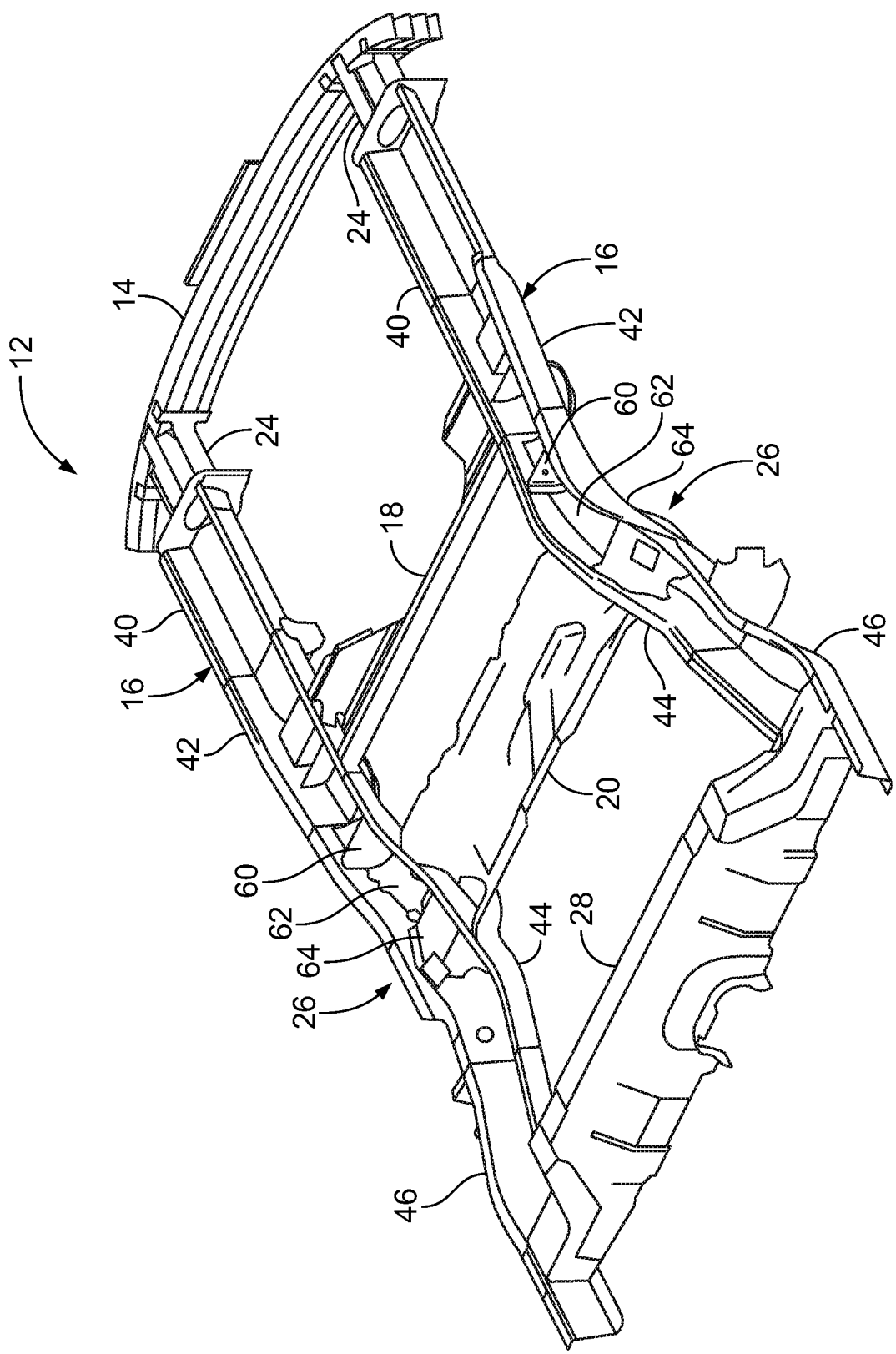
FIG. 2 is a perspective view of an example of a rear rail assembly of the vehicle body of FIG. 1.

FIG. 1 shows an example of a portion of a vehicle underbody, generally referred to as a vehicle underbody 10 herein. FIG. 2 shows an example of a rear underbody assembly 12. The vehicle underbody 10 includes the rear underbody assembly 12 and a pair of rockers 13. The rear underbody assembly 12 includes a bumper beam 14, a pair of rear rails 16, a first cross member 18, a second cross member 20, and a pair of crush cans 24. The bumper beam 14 is mounted to each of the crush cans 24. Each of the crush cans 24 is mounted to one of the rear rails 16. The first cross member 18 extends between the rear rails 16 at sub-frame joints for a rear sub-frame assembly and forward of a tire tub region for storing a spare tire (not shown). The second cross member 20 extends between the rear rails 16 at a location adjacent a transition region 26 in which each of the rear rails 16 extends downward and outboard. A third cross member 28 extends between each of the rockers 13 at a location adjacent a first joint 15 between one of the rear rails 16 and one of the rockers 13 and a second joint 17 between the other of the rear rails 16 and the other of the rockers 13.

Each of the rear rails 16 may be formed from a blank and may be hollow tubes made of a high strength low-alloy steel (HSLA) 350, dual phase (DP) 600, or DP780 manufactured using hydroforming or multiple stamped pieces. Each of the crush cans 24 may be made of HSLA350, DP600, or DP780 in an assembly of multiple stamped components which are spot welded to one another. Alternatively, each of the crush cans 24 may be formed as a single component with the respective rear rail 16.

Figure 3A:
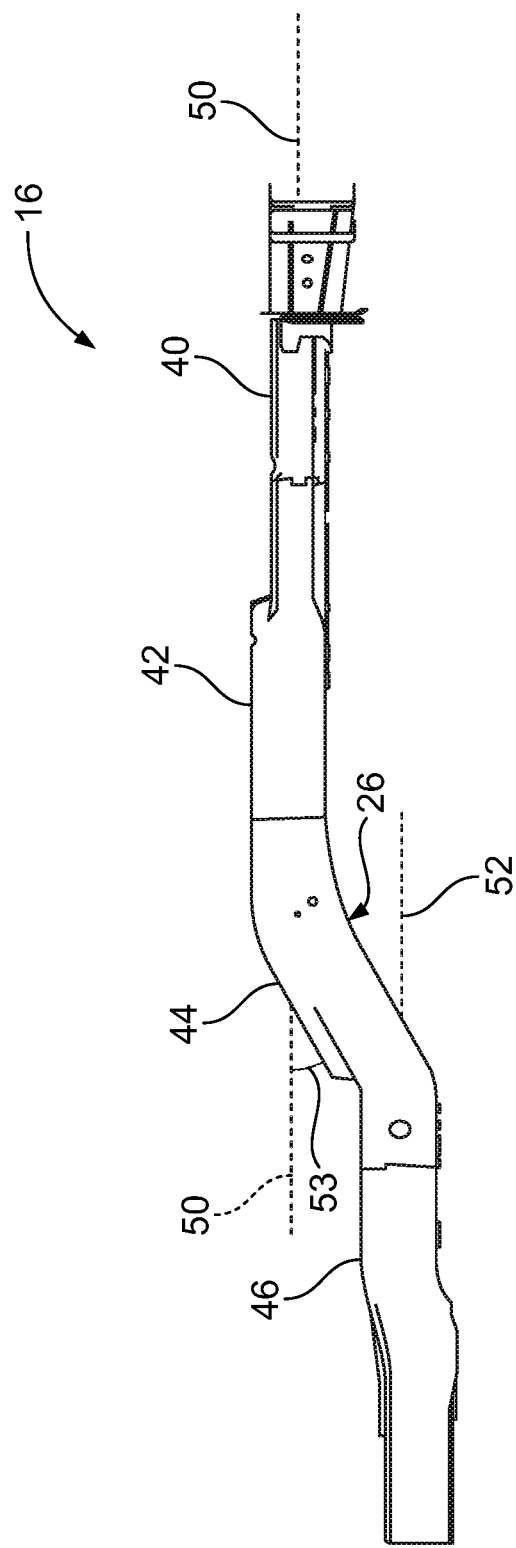
FIG. 3A is a side view of an example of a rear rail of the rear rail assembly of FIG. 2.
Figure 3B:
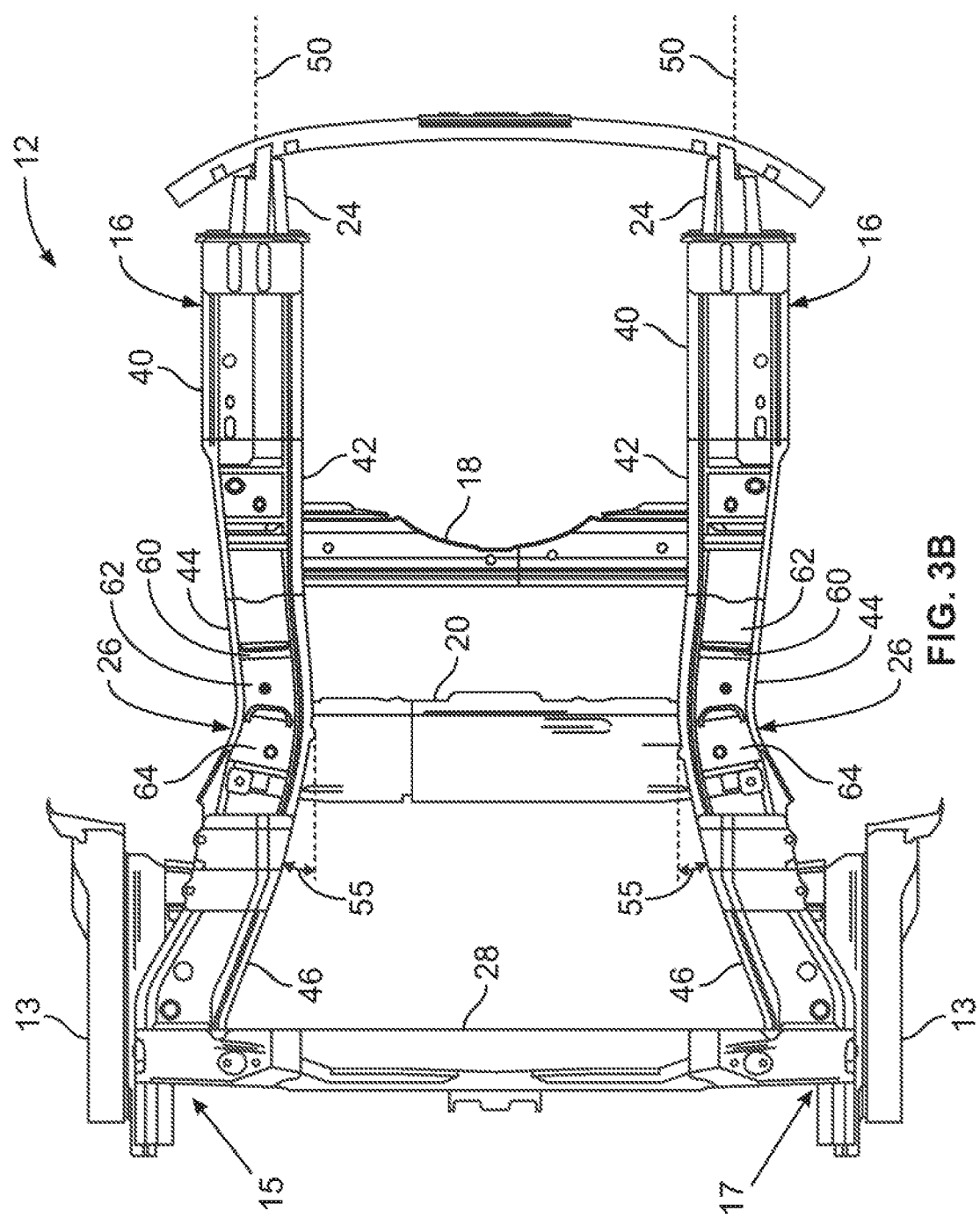
FIG. 3B is a top plan view of the rear rail assembly of FIG. 2.

FIG. 3A shows further detail of each of the rear rails 16. Each of the rear rails 16 includes a rear portion 40, a first mid-portion 42, a second mid-portion 44, and a forward portion 46. Each of the crush cans 24 extends from one of the rear portions 40. Each of the rear portions 40 defines a first central axis 50. Each of the forward portions 46 and part of each of the second mid-portions 44 define a second central axis 52. The first central axis 50 may be offset from the second central axis 52 at a distance between four and five inches. The second mid-portion 44 extends from the first central axis 50 to the second central axis 52 at the transition region 26. In one example, the second mid-portion 44 may extend downward to the forward portion 46 at an angle 53 between ten and thirty degrees. The second mid-portion 44 further extends outboard as shown in FIG. 3B. The second mid-portion 44 may extend outboard at an angle 55 between ten and thirty degrees.

If each of the rear rails 16 were of uniform strength, structural rigidity issues may arise when subjected to an impact. For example, each of the rear rails 16 may deform in an undesired manner in the longitudinal direction and at the transition region 26 when subjected to an impact. In comparison, thermally treating each of the rear rails 16 to form different strength zones allows for targeted strength zones according to impact stress to manage energy transferred to the underbody assembly 12 from the impact.

For example, the first mid-portion 42 is thermally treated to form a medium strength zone and the second mid-portion 44 is thermally treated to define a hard strength zone. Each of the rear rails 16 may be thermally treated so that the rear portion 40 and the forward portion 46 do not receive heat or receive minimal heat to retain a soft strength zone. The medium strength zone is formed to include a microstructure of one or more of ferrite, pearlite, martensite, and bainite and has a tensile strength of 600 MPa to 1000 MPa. The hard strength zone is formed to include a fully martensitic microstructure and has a tensile strength of 1000 MPa to 1900 MPa. The soft strength zone includes a microstructure of ferrite and/or pearlite and has a tensile strength of 400 MPa to 600 MPa. The first mid-portion 42 may be heated at between 700 and 900 degrees Celsius to form the medium strength zone. The second mid-portion 44 may be heated at or above 900 degrees Celsius to form the hard strength zone.

An arrangement of the different strength zones of each of the rear rails 16 provides a structure in which deformation occurs nearer a point of impact, e.g. a soft strength zone at the rear portion 40, and the strongest strength zone is located upon each of the rear rails 16 to structurally reinforce the geometry change at the transition region 26, e.g. a hard strength zone at the second mid-portion 44.

Locating the medium strength zone at the first mid-portion 42 provides a lower strength material area for creating a "living hinge" or hinge joint to absorb energy and minimize deformation into the rockers 13 and a vehicle cabin when the underbody assembly 12 is subjected to an impact.

Locating the hard strength zone at the second mid-portion 44 minimizes bending which may occur in the rear rail 16 due to the geometry change (downward and outboard) at the transition region 26 without a hard strength zone under an axial load from an impact.

A hard strength zone at the transition region 26 may also eliminate reinforcement components. In prior art examples, a portion of a rear rail with a geometry change is typically reinforced with brackets to control deformation. For example, FIGS. 2 and 3B show a first reinforcement component 60, a second reinforcement component 62, and a third reinforcement component 66. The reinforcement components are shown secured to each of the rear rails 16. However, forming a hard strength zone at the second mid-portion 44 provides enough structural rigidity so that the reinforcement components are not needed. Additionally, in comparison to prior art rear rails, targeted thermal treatment of each of the rear rails 16 requires a fewer number of joints so fewer joining methods are required for assembly.

Portions of a blank may be heated to define the different strength zones for a vehicle component, such as each of the rear rails 16, through either uniform or tailored heating. With uniform heating, the blank may be heated above an austenetizing temperature, referred to as Ac3. A temperature range associated with Ac3 may be between 800 and 850 degrees Celsius. With tailored heating, different portions of the blank may be heated to different temperatures to define various strength zones, such as hard, medium, and soft as described above.

Alternatively, portions of the blank may be cooled to define the different strength zones. The hard strength zone may be quenched above a critical cooling rate, such as a rate of 100 degrees Celsius per second (C/s). The critical cooling rate is a minimum continuous cooling rate to prevent undesired phase transformation of the blank. For example, the critical cooling rate for the rear rail 16 may be between 28 and 30 C/s. A medium strength zone may be a zone including a partially austenitized portion cooled at a rate below the critical cooling rate, such as a rate between 10 and 20 C/s. A soft strength zone may be a zone in which the blank has characteristics as delivered and in which the component is not austenitized. As described above, each of the rear rails 16 may be formed by hot stamping and cooling so that the first mid-portion 42 is a medium strength zone, the second mid-portion 44 is a hard strength zone, and the rear portion 40 and the forward portion 46 are soft strength zones.

Figure 4:
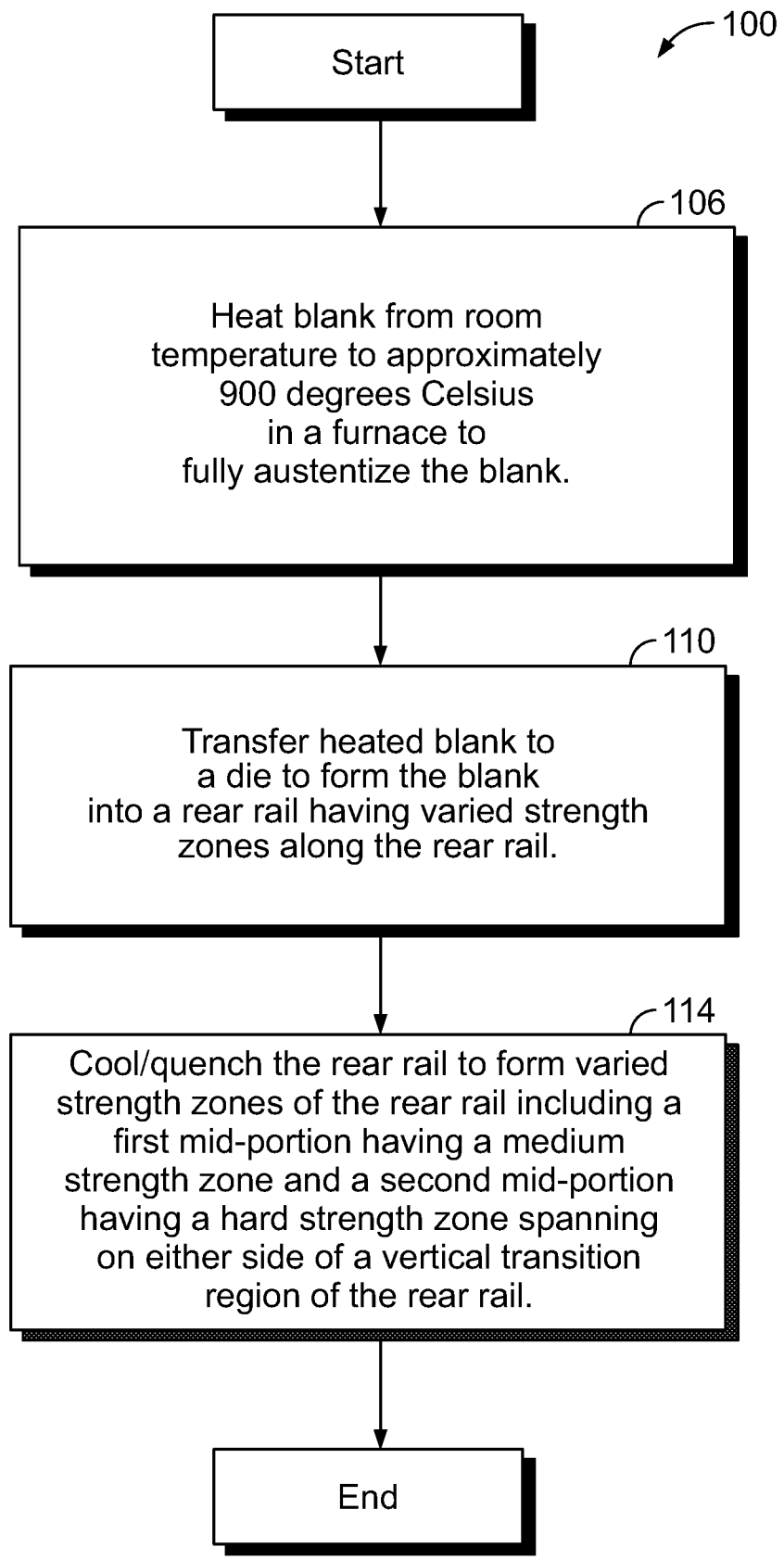
FIG. 4 is a flow chart showing an example of a method for creating a vehicle component.

FIG. 4 is a flow chart illustrating an example of a method of thermally treating a blank using a monolithic hot stamping process, referred to generally as a method 100. As mentioned above, each of the rear rails 16 may be formed by a monolithic hot stamping process. For example, in operation 106 a blank may be heated from room temperature to approximately 900 degrees Celsius in a furnace to fully austenitize the blank. In operation 110, the heated blank may then be transferred to a die where the blank may be formed into a desired shape and rapidly cooled. In one example, the blank may be formed into a rear rail for an underbody assembly, such as one of the rear rails 16. The blank may have a temperature of approximately 700 to 800 degrees Celsius and may be positioned within the die for cooling at approximately 100 C/s. Cooling the blank at this rate results in achieving a fully martensitic structure of the blank having a tensile strength of approximately 1300 to 1600 MPa at room temperature. Cooling rates and heating temperatures may vary based on a thickness of the blank and a type of material of the blank.

In operation 114, the cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die. The rear rail may be cooled to define different strength zones along the rear rail.

Figure 5:
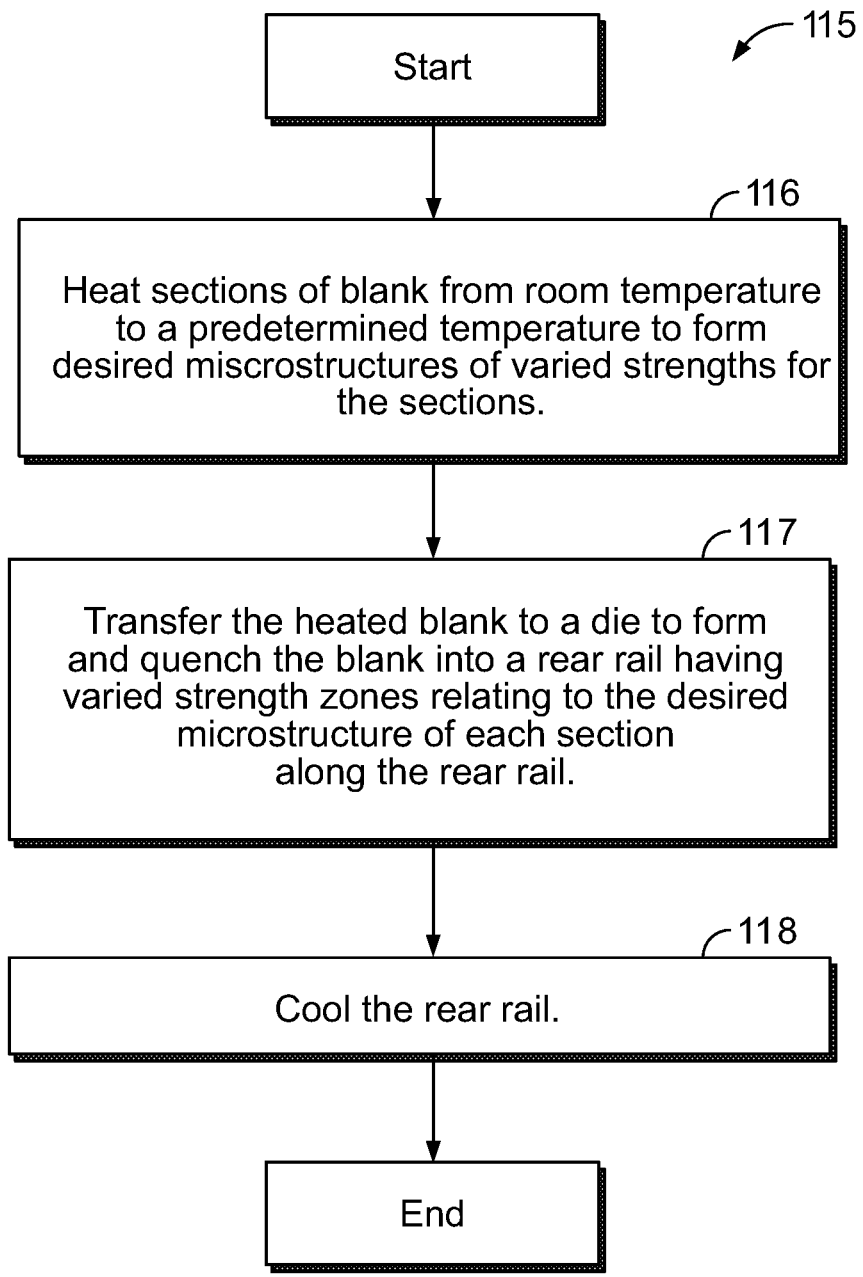
FIG. 5 is a flow chart showing an example of another method for creating a vehicle component.

FIG. 5 is a flow chart illustrating an example of a method of thermally treating a blank using a monolithic hot stamping process, referred to generally as a method 115. In operation 116, portions of the blank may be heated to a predetermined temperature to achieve desired microstructures of varied strength for the portions. For example, one or more portions of the blank may be heated to a temperature at or above 900 degrees Celsius to form a hard strength zone with a fully martensitic microstructure. One or more portions of the blank may be heated to a temperature between 700 and 900 degrees Celsius to form a medium strength zone having a microstructure including one or more of ferrite, pearlite, martensite and bainite. One or more portions of the blank may be thermally treated at a temperature at or below 700 degrees Celsius to retain characteristics of a soft strength zone having a microstructure of ferrite and/or pearlite. Heating temperatures may vary based on a thickness of the blank and a type of material of the blank.

In operation 117, the heated blank may then be transferred to a die where the blank may be formed and quenched into a desired shape. In one example, the blank may be formed into a rear rail having different strength zones for an underbody assembly, such as the rear rail 16.

In operation 118, the cooling process may be an annealing process or a quenching process. The annealing process is a slower process to use when equilibrium structures are desired. The quenching process is a faster process to use when non-equilibrium structures are desired. A typical hot stamping process may use the quenching process by applying water to the heated blank when positioned within the die. In operation 118, the rear rail may be cooled by either a uniform cooling or a cooling tailored to portions of the blank.

Figure 6:
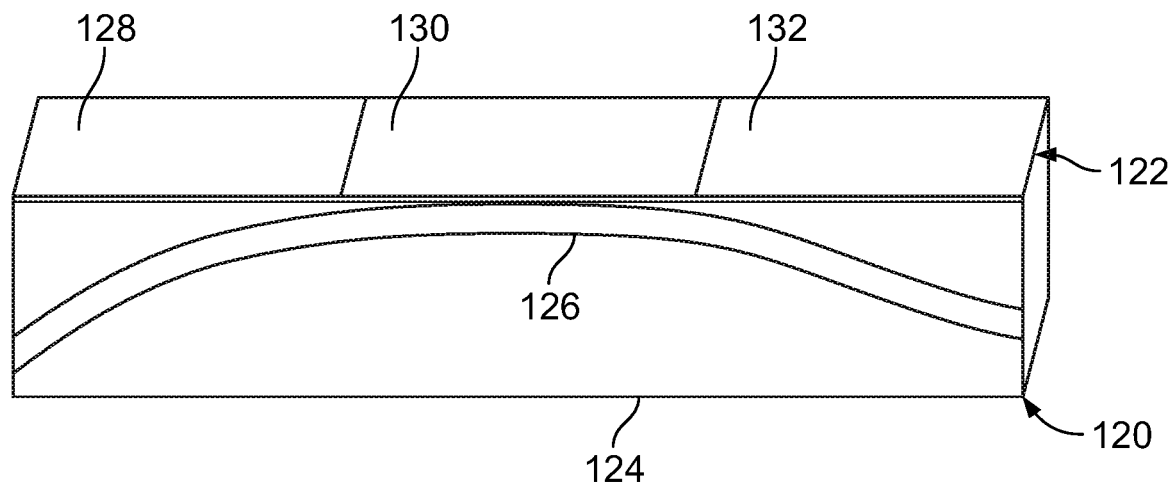
FIG. 6 is a schematic diagram showing an example of a die assembly and a blank.

The cooling portion of the hot stamping process may also use spacing between the blank and a die coolant channel to obtain the varied strength zones. For example, FIG. 6 is a schematic diagram showing an example of a die assembly 120 supporting a blank 122. A die 124 may include a coolant channel 126. The coolant channel 126 may be shaped within the die 124 to have varied spacing from the blank 122 to achieve varied microstructures and strength zones of the blank 122. The blank 122 may have uniform properties across the blank 122 prior to being positioned with the die 124. Portions of the blank 122 located closer to the coolant channel 126 are subject to rapid cooling/quenching to obtain a martensitic structure. Portions of the blank 122 located further away from the coolant channel 126 are subject to a slower cooling/quenching to obtain a pearlite structure. In this example, the spacing and shape of the coolant channel 126 relative to the blank 122 may result in having a first pearlite portion 128, a martensitic portion 130, and a second pearlite portion 132.

Figure 7:
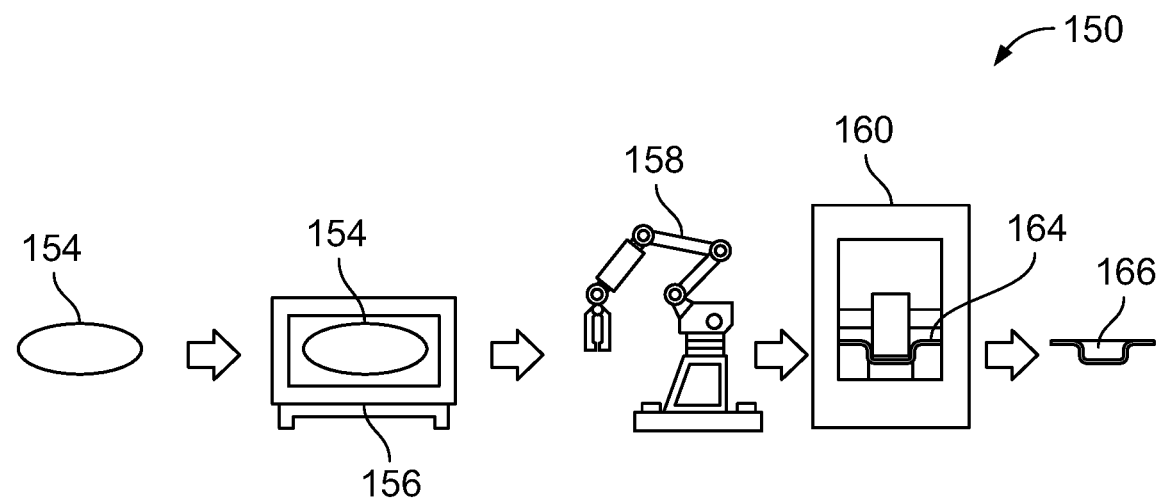
FIG. 7 is a diagrammatic view showing an example of a hot stamping process.

FIG. 7 is a diagrammatic view of an example of a hot-stamping line that may be used to manufacture an UHSS vehicle body component, referred to generally herein as a hot-stamping process 150. Hot-stamping, also known as hot forming or press hardening, is a process of stamping a blank while the metal is very hot, usually at a temperature above 600 degrees Celsius, and subsequently quenching the formed blank in a closed die. The hot-stamping process may convert low-strength blanks to high-strength components as described above.

In the hot-stamping process 150, a boron steel blank 154 (which may be press-hardenable steel) is placed in a furnace 156 and heated above a phase transformation temperature forming austenite. The phase transformation temperature is a temperature at which ferrite fully transforms into austenite. For example, the blank 154 may be heated at 900 to 950 degrees Celsius for a predetermined time in the furnace 156. The bake time and furnace temperature may vary depending on the material of the blank 154 and desired properties of the finished part. After heating, a robotic transfer system 158 may transfer the blank 154, now austenitized, to a press 160 having a die 164. The die 164 stamps the blank 154 into a desired shape while the blank 154 is still hot to form one or more components 166. The component 166 is then quenched while the die 164 is still closed using water or other coolant as described above. Quenching is provided at a cooling speed of 30 to 150 C/s for a predetermined duration at the bottom of the stroke. Quenching changes the microstructure of the blank from austenite to martensite. After quenching, the component 166 is removed from the press 160 while the component is still hot (e.g., about 150 degrees Celsius). The component 166 may then be cooled on racks.

A hot-stamping process may provide numerous advantages over other high-strength steel forming methods such as cold-stamping. One advantage of hot-stamping process is a reduced spring back and warping of the blank. Hot-stamping also allows complex shapes to be formed in a single stroke of the die to reduce downstream processing and increase efficiency in the manufacturing of the vehicle component from the blank.

Hot-stamped components may be both lightweight and strong. Examples of automotive components that may be formed by hot-stamping may include body pillars, rockers, rails, bumpers, intrusion beams, carrier understructure, mounting plates, front tunnels, front and rear bumpers, reinforcement members, and side rails. Higher strength zones of the components provide increased resistance to deformation during an impact while softer strength zones may be placed in locations where the component is to be attached to other components or where deformation is desired.

While various embodiments are described above, it is not intended that these embodiments describe all possible forms encompassed by the claims. The words used in the specification are words of description rather than limitation, and it is understood that various changes can be made without departing from the spirit and scope of the disclosure. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle underbody assembly comprising:
   a pair of rockers;
   a pair of rear rails each extending from one of the rockers and each including a rear portion, a first mid-portion, a second mid-portion, and a forward portion, wherein each of the forward portions is secured to one of the rockers at one of a first joint and a second joint;
   a first cross member extending between the rear rails at a transition region between the second mid-portion and the forward portion; and
   a second cross member extending between the rear rails at locations adjacent the first and second joints,
   wherein each of the rear rails is thermally treated so that the second mid-portions form a hard strength zone when compared to strength zones of the first mid-portion and forward portion, respectively.

2. The assembly of claim 1, wherein the hard strength zone is further defined as a zone having a fully martensitic microstructure.

3. The assembly of claim 1, wherein the hard strength zones at the transition regions prevent deformation of each of the second mid-portions when subjected to an axial load of between 5000 and 15,000 pounds.

4. The assembly of claim 1, wherein the transition region is further defined as a transition from a first central axis defined by the rear portion to a second central axis defined by a lower portion of the second mid-portion.

5. The assembly of claim 1, wherein each of the rear portions has a microstructure of ferrite and/or pearlite and each of the first mid-portions is thermally treated to form a microstructure of one or more of ferrite, pearlite, martensite, and bainite.

6. The assembly of claim 1, wherein each of the second mid-portions extends outboard at the transition region at an angle between ten and thirty degrees.

7. The assembly of claim 1, wherein each of the first mid-portions is thermally treated at a temperature between 700 and 900 degrees Celsius to form a medium strength zone and each of the second mid-portions is thermally treated at a temperature at or above 900 degrees Celsius to form the hard strength zone.

8. The assembly of claim 7, wherein the medium strength zone has a tensile strength between 600 MPa and 1000 MPa and the hard strength zone has a tensile strength between 1000 MPa and 1900 MPa.

9. A rear rail for a vehicle comprising:
   a rear portion having a first soft strength zone;
   a first mid-portion thermally treated to form a medium strength zone extending from the rear portion; and
   a second mid-portion thermally treated to form a hard strength zone extending from the first mid-portion, downward, and outboard to a forward portion of the rear rail to structurally reinforce the rear rail at the downward and outboard geometry change, the forward portion having a second soft strength zone.

10. The rear rail of claim 9, wherein the first mid-portion is thermally treated at a temperature between 700 and 900 degrees Celsius and the second mid-portion is thermally treated at a temperature at or above 900 degrees Celsius.

11. The rear rail of claim 10, wherein the thermal treatment of the first mid-portion forms a microstructure having one or more of ferrite, pearlite, martensite, and bainite and wherein the thermal treatment of the second mid-portion forms a fully martensitic microstructure.

12. The rear rail of claim 9, wherein the second mid-portion is thermally treated to form a hard strength zone and is located adjacent sub-frame assembly joints.

13. The rear rail of claim 9, wherein the first mid-portion is thermally treated at a cooling rate between 10 and 20 degrees Celsius per second and the second mid-portion is thermally treated at a cooling rate of approximately 100 degrees Celsius per second.

14. The rear rail of claim 9, wherein the thermal treatment is a cooling process administered within a die having a coolant channel with a first portion and a second portion spaced apart from the second mid-portion a length less than a length between the coolant channel first portion and the first mid-portion.

15. The rear rail of claim 9, wherein the rear rail is thermally treated so that the rear portion and the forward portion do not receive heat and retain a microstructure including one or both of ferrite and pearlite.

16. The rear rail of claim 9, wherein the second mid-portion extends downward at an angle between ten and thirty degrees and outboard at an angle between ten and thirty degrees.

17. The rear rail of claim 9, wherein the hard strength zone has a tensile strength tuned to prevent deformation of the second mid-portion when the rear rail is subjected to an axial load of between 5,000 and 15,000 pounds.

* * * * *